United States Patent [19]

Pitt et al.

[11] Patent Number: 4,773,214

[45] Date of Patent: Sep. 27, 1988

[54] FIRING EQUIPMENT THAT CAN BE OPERATED UNDER TURBOCHARGE

[75] Inventors: Reinhold U. Pitt; Günther H. Dibelius, both of Aachen, Fed. Rep. of Germany

[73] Assignee: L. & C. Steinmüller GmbH, Gummersbach, Fed. Rep. of Germany

[21] Appl. No.: 913,967

[22] Filed: Oct. 1, 1986

[30] Foreign Application Priority Data

Oct. 12, 1985 [DE] Fed. Rep. of Germany ....... 3536451

[51] Int. Cl.⁴ .............................................. F02C 6/18
[52] U.S. Cl. .................................. 60/39.182; 122/7 R
[58] Field of Search ........... 60/39.181, 39.182, 39.183, 60/39.511, 39.07; 122/7 R

[56] References Cited

U.S. PATENT DOCUMENTS

| | | | |
|---|---|---|---|
| 2,633,707 | 4/1953 | Hermitte et al. | 60/39.182 |
| 3,704,587 | 12/1972 | Krieb et al. | 60/39.182 |
| 3,715,887 | 2/1973 | Weatherly et al. | |
| 3,765,170 | 10/1973 | Nakamura | |
| 4,028,883 | 6/1977 | Meyer-Kahrweg | 60/39.182 |
| 4,353,206 | 10/1982 | Lee | 60/39.182 |

FOREIGN PATENT DOCUMENTS

| | | |
|---|---|---|
| 1049825 | 1/1954 | France . |
| 3206688 | 9/1982 | Fed. Rep. of Germany . |
| 3004848 | 11/1983 | Fed. Rep. of Germany . |
| 3224577 | 1/1984 | Fed. Rep. of Germany . |
| 3404915 | 8/1984 | Fed. Rep. of Germany . |

Primary Examiner—Louis J. Casaregola
Attorney, Agent, or Firm—Becker & Becker

[57] ABSTRACT

Firing equipment that can be operated under turbocharge, especially fluidized bed firing equipment for a steam generator. At least two successively arranged air compressors are provided, including a first compressor that is driven by a first turbine, which is disposed on a common shaft with the first compressor, and forms together with the latter a turbocharger, with the energy needed for driving the first compressor being extracted from the flue gas of the turbocharged firing equipment. An air preheater is disposed between the second compressor and the firing equipment, with flue gas being supplied thereto. A second turbine drives the second compressor. At least during turbocharged operation of the firing equipment, the flue gas is conveyed at high temperature first to the second turbine then to the air preheater. An electrical apparatus that is operable at least as a generator is operatively associated with the second compressor and the second turbine.

2 Claims, 1 Drawing Sheet

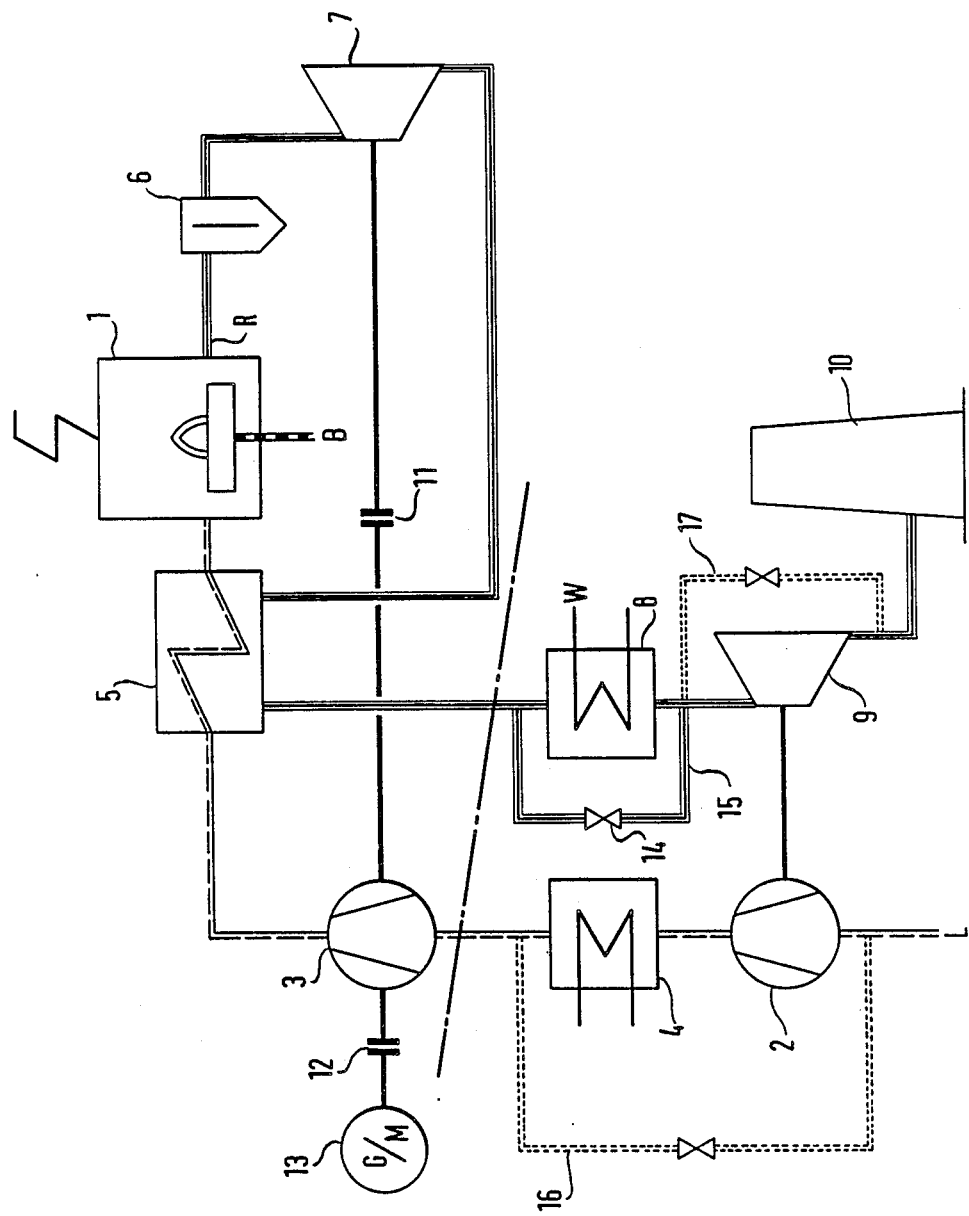

FIRING EQUIPMENT THAT CAN BE OPERATED UNDER TURBOCHARGE

BACKGROUND OF THE INVENTION

1. Field of the Invention

The present invention relates to firing equipment that can be operated under pressure charge or turbocharge, especially fluidized bed firing equipment for a steam generator.

2. Description of the Prior Art

German Pat. No. 30 04 848 Dibelius et al issued Nov. 10, 1983 and belonging to the assignee of the present invention discloses fluidized bed firing equipment of this general type, with this known firing eqiupment being characterized by the following features:

(a) the compressor is divided into two successively arranged individual compressors, with the first compressor being driven only by a gas turbine, and the second compressor being driven by independent power;

(b) a controllable air by-pass line is connected in parallel to the first compressor; and (c) a controllable flue gas by-pass line having a flue gas cooler is connected in parallel to the gas turbine.

This combination of features of the heretofore known firing equipment solves the task of undertaking the supply of air to the fluidized bed firing equipment in such a way that at atmospheric operation only the devices required herefor operate, and that the supplemental devices required for turbocharged operation obtain their energy requirement that exceeds a minimum pressure necessary for this manner of operation nearly exclusively from the energy that is then available in the flue gas. During turbocharged operation, the flue gas is conveyed only to the turbine that drives the first compressor, while the second compressor is driven by an electric motor to provide the necessary quantity of air. During non-turbocharged operation, air is provided primarily by the second compressor, and the flue gas is conveyed to an air preheater disposed between the firing equipment and the second compressor, and to a chimney. Furthermore, to maintain the chimney inlet temperature and the production equilibrium, it is possible to control the air by-pass line of the first compressor and the flue gas by-pass line of the gas turbine in opposite directions in such a way that the pressure increase system is in a position to continuously supply the fluidized bed firing equipment up to the level of the highest design pressure.

However, by operating the second compressor with independent power, no optimum efficiency can be achieved with the heretofore known firing equipment, even during turbocharged operation.

An object of the present invention is to be able to achieve optimum efficiency.

BRIEF DESCRIPTION OF THE DRAWING

This object, and other objects and advantages of the present invention, will appear more clearly from the following specification in conjunction with the accompanying schematic drawing, which illustrates one exemplary embodiment of the inventive firing equipment.

SUMMARY OF THE INVENTION

The firing equipment of the present invention comprises: at least two successively arranged air compressors, including a first compressor and a second compressor; a first turbine that drives said first compressor, is disposed on a common shaft with the first compressor, and forms together with the latter a turbocharger, with the energy needed for driving the first compressor being extracted from the flue gas of the turbocharged firing equipment; the first turbine has an outlet that communicates with a chimney; an air preheater that is disposed between the second compressor and the firing equipment, and to which flue gas is supplied; a second turbine that drives the second compressor; at least during turbocharged operation of the firing equipment, the flue gas is conveyed at high temperature first to the second turbine and then to the air preheater; and an electrical apparatus that is operable at least as a generator, and that is operatively associated with the second compressor and the second turbine.

With the inventive firing equipment, even during turbocharged operation the combustion air or air charge is always supplied to the combustion chamber of the steam generator at high temperature, as a result of which the thermal efficiency of the combined gas-steam-power process is improved. The first compressor is driven by a turbine that is supplied with flue gas at a temperature that is reduced to such an extent that the flue gas is conveyed directly to the chimney or smoke stack from the outlet of the turbine without the necessity for further cooling. Since a partial depressurization is effected in the second turbine at high temperature, electrical power can be generated in addition to the compression. If the electrical apparatus can also be operated as an electric motor, it is not necessary to have a separate motor for the start-up.

If the adjustment of the temperature for the first turbine cannot be sufficiently achieved by the partial depressurization of the second turbine, and if the heat transfer from the flue gas to the compressed air charge in the preheater is not sufficient, it is expedient to dispose between the air preheater and the first turbine a heat exchanger that is in the water circulation system of the steam generator. This heat exchanger extracts from the flue gas supplied thereto just enough heat that the energy remaining in the flue gas suffices for driving the first compressor via the first turbine.

To regulate production during turbocharge operation, it can be expedient to connect a controllable flue gas by-pass line in parallel with the heat exchanger.

To minimize the energy required for compression, it is expedient to dispose a cooler between the first and second compressors to cool the air between them. The heat withdrawn by the cooler can be applied to the steam-producing process, or can be removed by cooling water.

In the event that the inventive firing equipment must be operated under atmospheric conditions or at a temperature that is much lower than the firing temperature, since otherwise the flue gas could only be scrubbed with great difficulty, it is further proposed pursuant to the present invention that an air charge by-pass line be associated with the first compressor and the cooler, and a flue gas by-pass line be associated with the second turbine, with both by-pass lines preferably being controllable. In the event that the aforementioned conditions could occur, the electrical apparatus that is associated with the second compressor should be capable of being uncoupled therefrom. It is also within the scope of the present invention to construct the subassembly comprising the first compressor and first turbine of a plurality of turbochargers that are connected in parallel in order to be able to use commercially available turbochargers of smaller output, even for larger firing equipment outputs.

Further specific features of the present invention will be described in detail subsequently.

DESCRIPTION OF THE PREFERRED EMBODIMENTS

Referring now to the drawing in detail, compression of the combustion air or air charge L for the firing equipment or furnace 1 is effected via two successively arranged compressors 2 and 3, between which is disposed a cooler 4. Prior to entering the firing equipment 1, the compressed air charge is preheated in an air preheater 5.

If the firing equipment is to be operated with a fuel B that leads to dust loading of the flue gas R that leaves the firing equipment, there is disposed downstream of the firing equipment a bag filter 6 or some other separator that is able to cope with high flue gas temperatures, preferably the combustion chamber temperature. In recent times, such filters have become available. The flue gas is partially depressurized in a hot-supplied turbine 7, accompanied, for example, by a temperature reduction of from 850° C. to 550° C. The thus partially depressurized flue gas is supplied to the air preheater 5. Since not the only the air side but also the flue gas side of the air preheater are operated under pressure, the air preheater can be small and correspondingly more economical than in the situation where operation is not conducted under pressure.

The flue gas leaving the air preheater, for example at a temperature of 385° C., is supplied to a heat exchanger 8 that is in the water circulation system W of the steam generator. The gas leaving the heat exchanger 8 is supplied to a turbine 9 which, together with the first compressor 2, form a turbocharger. The flue gas can be supplied to the turbine 9, at, for example, a temperature of 188° C., so that after this gas has been depressurized, it can be supplied to a chimney or smoke stack 10 at an appropriately low and permissible temperature. Thus, the cooler 4 is disposed downstream on the compressor side of the turbocharger, which comprises the compressor 2 and the turbine 9 on a free-running shaft, and the heat exchanger 8 is disposed upstream of the turbocharger on the turbine side. In the drawing, this subassembly is separated from the other elements by a dot-dash line.

The turbine 7 is connected to the compressor 3 by a coupling 11, for example. The compressor 3, in turn, is connected via a coupling 12 to an electrical apparatus 13. This electrical apparatus 13 can be operated as a generator or a motor, with operation as a motor primarily being necessary during start-up.

For pressure adjustment, a flue gas by-pass line 15 that can be controlled by a valve 14 is associated with the heat exchanger 8. In this case, the heat exchanger 8 is preferably connected, on the water side, in a forced circulation.

By-pass lines 16 and 17, which preferably can be controlled, and which are illustrated by dotted lines, are associated on the one hand with the compressor 2 and the cooler 4, and on the other hand with the turbine 9. These by-pass lines 16 and 17 could become necessary if the flue gas temperature becomes too low, and/or operation is conducted at atmospheric pressure. The inventive arrangement could also be designated as a "turbocharged gas turbine". Illustrated above the dot-dash line is the "gas turbine" engine, which comprises the compressor 3, the air preheater 5, the firing equipment 1, the turbine 7, and the generator 13. Illustrated in the lower portion of the drawing is the turbocharger 1, 9 along with the associated heat exchangers and coolers, all of which are associated with the gas turbine.

In the inventive arrangement, the pressure in the combustion chamber of the firing equipment 1 can be selected pursuant to combustion and emmission criteria, and/or for reasons of compactness. The optimum (pertaining to the combustion chamber temperature of the firing equipment) pressure condition of the previously defined "gas turbine" engine can be set by an appropriate base pressure at the inlet of the compressor 3; this base pressure is produced with the aid of the turbocharger 2, 4, 8, 9. The value of this base pressure is determined during design by the temperature ahead of the turbine 9, and hence by the corresponding cooling of the flue gas that is supplied to the turbine. During operation, the entry temperature into the turbine 9 can be regulated, especially by appropriate adjustment contacts on the by-pass line 15 of the heat exchanger 8.

The present invention is, of course, in no way restricted to the specific disclosure of the specification and drawing, but also encompasses any modifications within the scope of the appended claims.

What we claim is:

1. Firing equipment that can be operated under turbocharge and that includes a turbocharged firing mechanism, comprising:
   at least two successively arranged air compressors, including a first compressor, and a second compressor that communicates via a conduit means with the turbocharged firing mechanisms;
   a first turbine, which drives said first compressor, is disposed on a common shaft with said first compressor, and forms together with the latter a turbocharger, with the energy needed for driving said first compressor being extracted from the flue gas of the turbocharged firing mechanism via a conduit means to the first turbine driving the first compressor; said first turbine has an outlet that communicates with a chimney;
   an air preheater that is disposed between said second compressor and said firing mechanism, with flue gas being supplied to said air preheater via a conduit means;
   a second turbine that drives said second compressor; at least during turbocharged operation of said firing equipment, the flue gas is conveyed at high temperature first to said second turbine via a conduit means, and subsequently to said air preheater, which air preheater is disposed between that second compressor and that firing mechanism;
   an electrical apparatus that is operable at least as a generator, and that is operatively associated with said second compressor and said second turbine;
   said firing equipment being intended for a steam generator, which includes a water circulation system; which includes, disposed between said air preheater and said first turbine, a heat exchanger that is in said water circulation system; which includes a controllable flue gas by-pass line that is connected in parallel with said heat exchanger; which includes a cooler disposed between said first compressor and said second compressor; and which includes, for non-turbocharged operation, an air charge by-pass line connected in parallel with the subassembly comprising first compressor and cooler, and a flue gas by-pass line connected in parallel with said first turbine.

2. Firing equipment according to claim 1, in which said two last-mentioned by-pass lines are controllable via control value means therewith.

* * * * *